(12) United States Patent
Frey et al.

(10) Patent No.: US 7,140,547 B2
(45) Date of Patent: Nov. 28, 2006

(54) DATA STORAGE CONFIGURATION HAVING A DISPLAY DEVICE

(75) Inventors: Volker Frey, Stuttgart (DE); Jochen Müller, Wenzenbach (DE); Martin Randler, Stuttgart (DE); Bernhard Trier, Oberkochen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/609,884

(22) Filed: Jun. 30, 2003

(65) Prior Publication Data

US 2004/0004821 A1    Jan. 8, 2004

Related U.S. Application Data

(63) Continuation of application No. PCT/DE01/04949, filed on Dec. 28, 2001.

(30) Foreign Application Priority Data

Dec. 29, 2000    (DE) ................ 100 65 748

(51) Int. Cl.
G06K 19/06        (2006.01)
(52) U.S. Cl. ............... 235/492; 235/488; 235/489
(58) Field of Classification Search ................. 235/492, 235/486, 488, 489; 349/1, 96, 122, 152
See application file for complete search history.

(56) References Cited

U.S. PATENT DOCUMENTS

| | | | |
|---|---|---|---|
| 4,876,441 A | 10/1989 | Hara et al. | 235/488 |
| 4,918,631 A | 4/1990 | Hara et al. | 235/380 |
| 5,003,222 A * | 3/1991 | Washo | 313/511 |
| 5,422,516 A | 6/1995 | Hosokawa et al. | 257/775 |
| 5,818,030 A | 10/1998 | Reyes | 235/492 |
| 6,050,494 A * | 4/2000 | Song et al. | 235/492 |
| 6,161,761 A * | 12/2000 | Ghaem et al. | 235/492 |
| 6,360,954 B1 * | 3/2002 | Barnardo | 235/492 |
| 6,414,441 B1 * | 7/2002 | Fries et al. | 315/169.3 |
| 6,619,553 B1 * | 9/2003 | Bobrov et al. | 235/492 |

FOREIGN PATENT DOCUMENTS

| | | |
|---|---|---|
| DE | 196 04 374 A1 | 8/1997 |
| DE | 196 31 557 A1 | 2/1998 |
| DE | 198 05 282 A1 | 8/1999 |
| DE | 199 23 138 C1 | 11/2000 |
| DE | 199 63 165 C1 | 3/2001 |
| EP | 0 542 524 A1 | 5/1993 |
| EP | 0 845 695 A2 | 6/1998 |
| JP | 09311922 A * | 12/1997 |

* cited by examiner

*Primary Examiner*—Kimberly D. Nguyen
(74) *Attorney, Agent, or Firm*—Laurence A. Greenberg; Werner H. Stemer; Ralph E. Locher

(57) ABSTRACT

A portable data storage configuration has a card base and a display device, the display device being fixed to the card base. The display device is only partially connected to the card base by the fixed connection. This mounting technique results in that almost no lateral or shear forces act on the display device.

26 Claims, 1 Drawing Sheet

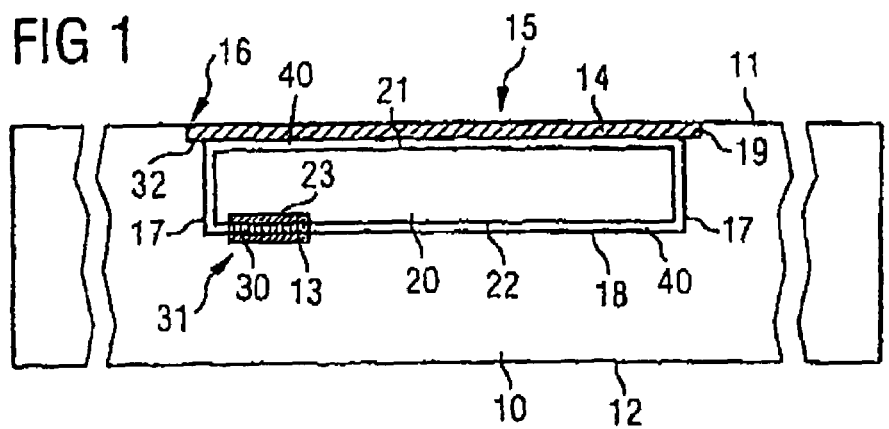
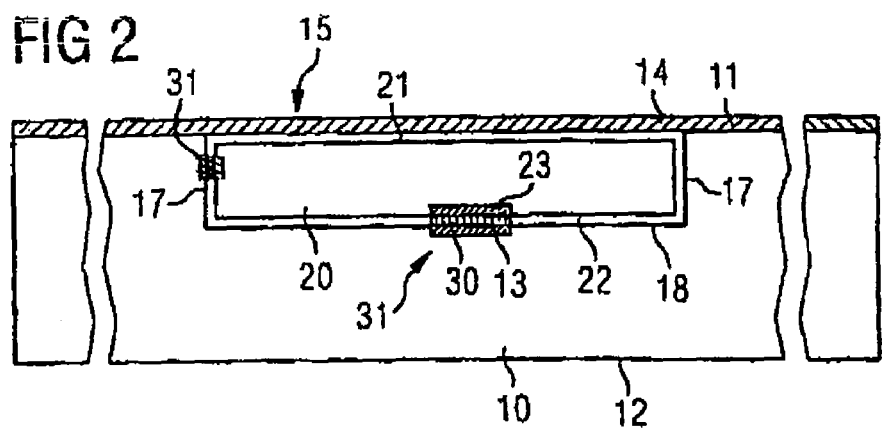
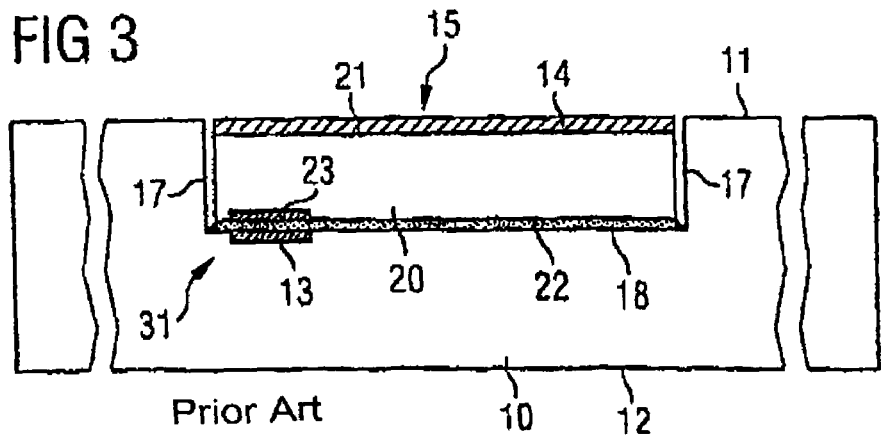
Prior Art

DATA STORAGE CONFIGURATION HAVING A DISPLAY DEVICE

CROSS-REFERENCE TO RELATED APPLICATION

This application is a continuation of copending International Application No. PCT/DE01/04949, filed Dec. 28, 2001, which designated the United States and was not published in English.

BACKGROUND OF THE INVENTION

Field of the Invention

The invention relates to a portable data storage configuration having a card base and a display device, the display device being fixed to the card base.

It is increasingly common for display devices, for instance liquid crystal displays (LCD), ferroelectric liquid crystal displays, cholesteric liquid crystal displays or organic light emitting diodes (OLED), to be used in data storage configurations such as chip cards, credit cards, cash cards or the like. In these systems the display device must be mounted in the card base of the data storage configuration in a mechanically reliable and stable way in order to be able to resist bending stresses.

The full-area connection of a display device with a card body is described in U.S. Pat. No. 4,876,441.

SUMMARY OF THE INVENTION

It is accordingly an object of the invention to provide a data storage configuration having a display device that overcomes the above-mentioned disadvantages of the prior art devices of this general type, which provides a mechanically reliable method of fixing the display device in a data storage configuration, such that low mechanical stress is exerted on the display device during use.

With the foregoing and other objects in view there is provided, in accordance with the invention, a portable data storage configuration. The data storage configuration contains a card base having a main surface, and a display device having a main surface disposed opposite the main surface of the card base. The card base is permanently connected to the display device over a partial region of the main surfaces and defines a permanent connection.

According to the invention it is intended that the display device is only partially connected to the card base by a fixed connection. This mounting technique results in that almost no lateral or shear forces act on the display device. As a result of this, the reliability of the display device and hence of the whole data storage configuration can be improved considerably.

In a preferred embodiment, the card base contains on a first face a first recess in which the display device is placed. If the lateral dimensions of the display device are made to match the dimensions of the first recess, a level surface is obtained on the first face of the card base. In addition, the first recess offers protection against mechanical damage to the display device.

In a first embodiment of the invention, the display device is fixed to the floor of the first recess over a section of its passive face. The lateral and shear forces acting between the display device and the card base are then particularly low if, according to a further embodiment, the fixed connection between the display device and the card base is provided in an area at the edge of the floor of the first recess.

In a second variant, the display device is at least fixed to a sidewall of the first recess with a section of its sidewall. Hence neither the active nor the passive face of the display device contains a fixed connection to the card base. A "floating" support of the display device in the card base is achieved by both variants. The forces acting on the display device are thereby minimized even under high stress of the card base, for instance bending.

In the embodiments of the invention described above, it is possible that the display device itself already contains a controller for controlling the display device. For instance a suitable control chip that receives its signals via an antenna may be integrated directly in the display device. In this type of configuration it would therefore also be possible to do without an electrical connection to the card base, or rather to control elements integrated in the card base.

In another embodiment of the invention, the card base contains a first contact element, and the display device contains a second contact element, which form the fixed connection by being connected together electrically and mechanically. The controller is in this case provided in a chip placed in the card base for example. The chip would then be connected to the first contact element via printed conductors. The fixed connection between the display device and the card base is preferably made solely in the area of the first and second contact elements. The area over which the display device and the card base are connected together is therefore defined solely by the size of the contact elements. This area is preferably smaller than 10% of the area of the passive face of the display device. The remaining area of the display device does not contain any fixed connection to the card base according to the idea of the invention.

In a further embodiment, at least the active face of the display device is covered by a cover layer. In this case the cover layer can already be fixed to the active face before introducing the display device into the card base. Alternatively, the display device can be placed on the card base first, and then the active face of the display device covered. The cover layer can also occupy the whole area of the first face of the card base, covering the active face of the display device in the process.

The cover layer is preferably fixed to the card base, while having no fixed connection to the display device. Consequently this results in that the display device is connected to the card base only in the area of the first and second contact elements for example. The mechanical stresses that can act on the display device under a bending stress are thereby minimal.

In a further embodiment, the card base contains a second recess, whose lateral dimensions are larger than those of the first recess and approximately the same as those of the cover layer. In this case the respective sidewalls of the first and second recess are positioned approximately equidistantly in order to create a support surface for the cover layer. The first recess therefore has larger lateral dimensions, but a smaller depth than the first recess. This results in a step-shaped cross-sectional outline to the first and second recess in the card base. The step formed between the first and second recess is then used for creating a support surface for the cover layer. The depth of the second recess is here adapted to fit the thickness of the cover layer, so that it results in a flat surface of the first face of the data storage configuration.

A further reduction in the forces acting on the display device can be achieved by providing a lubricant between the cover layer and the active face of the display device.

Preferably a lubricant is also provided between the passive face of the display device and the floor of the first recess.

A better view of the display device is obtained by configuring the cover layer as a polarizer.

The fixed connection between the display device and the card base is preferably created by a conducting adhesive.

Other features which are considered as characteristic for the invention are set forth in the appended claims.

Although the invention is illustrated and described herein as embodied in a data storage configuration having a display device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, sectional view of a first exemplary embodiment of a data storage configuration according to the invention;

FIG. 2 is a diagrammatic, sectional view of a second exemplary embodiment of the data storage configuration according to the invention; and FIG. 3 is a diagrammatic, sectional view of the data storage configuration known in the art.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 3 thereof, there is shown a configuration known in the art of a display device 20 in a data storage medium. Normally a card base 10 contains a recess 15 in which the display device 20 is placed. The lateral dimensions of the recess 15 are here adapted to fit the lateral dimensions of the display device 20, so that a first face 11 of the card base 10 ends approximately flush with an active face 21 of the display device 20. In addition, a cover layer 14 fixed onto the display device 20 is normally placed on the active face 21, and this is meant to provide mechanical protection from external influences. On a passive face 22 of the display device 20 there is a second contact element 23 that is mechanically and electrically connected to a corresponding first contact element 13 on a floor 18 of the recess 15. The first contact element 13 is, for example, electrically connected to a non-illustrated control chip in the card base 10. In order to create a mechanical connection between the display device 20 and the card base 10, the passive face 22 of the display device 20 is connected to the floor 18 of the recess 15 over its full surface. The connection is created by an adhesive or a soldered joint. The sidewalls of the display device 20 may also be connected to sidewalls 17 of the recess 15, for example with an adhesive.

A first exemplary embodiment of the data storage configuration according to the invention is shown in FIG. 1. The first recess 15 is provided in the first face 11 of the card base 10. The display device 20 configured to match the dimensions of the first recess 15 is placed in the recess 15. On the passive face 22, the display device 20 contains the second contact element 23 that is mechanically and electrically connected via an adhesive 30 to the first contact element 13 placed in a corresponding position. A conductive adhesive is preferably used as the adhesive 30, which also ensures electrical contact between the first and the second contact elements 13, 23. A connection 31, formed by the first and second contact elements 13, 23, constitutes the only fixed contact between the display device 20 and the card base 10. Therefore, the remaining area of the passive face 22 can move with respect to the floor 18 of the recess 15. A movement might result for instance from bending of the card base 10.

The active face 21 of the display device 20 is protected by the cover layer 14. According to the ideas of the invention, the cover layer 14 and the display device 20 have no area over which there is a fixed connection between them. For this reason, the cover layer 14 is fixed to the card base 10. The card base 10 contains for this purpose a second recess 16 that has somewhat larger lateral dimensions than the first recess 15, as is clearly visible in the cross section. This results in a step-shaped cross-sectional outline. The cover layer 14, whose thickness is matched to the depth of the second recess 16 in order to achieve a flat surface on the first face 11, therefore lies on support areas 32 and is fixed to these, and possibly to a side wall 19, using an adhesive for instance.

In order to reduce lateral and shear forces that can arise in bending, a lubricating film 40 is advantageously introduced between the underside of the cover layer 14 and the active face 21, and between the floor 18 and the passive face. The lubricant 40 can for instance be silicone oil.

A hermetic seal of the first recess is obtained by the fixed connection between the cover layer 14 and the card base 10. The cover layer 14 is preferably configured as a polarizer, which on the one hand can conceal any signs of melting in the area of the connection 31, and on the other hand increases the readability of the display device.

In FIG. 1, the connection 31 formed from the first and the second contact elements 13, 23 is positioned in an edge region of the floor 18 of the first recess 15. This embodiment enables a particularly large reduction in shear forces. As can be seen in FIG. 2, the connection 31 can be positioned in any area of the passive face 22 of the display device. Whatever the position, the stress on the display device is reduced compared with configurations known in the art.

The second exemplary embodiment as shown in FIG. 2 further differs from the first exemplary embodiment in that the card base 10 contains only a first recess 15. The fact that the cover layer 14 is placed over the whole face 11 of the card base 10 results in that there is no need to provide a second recess to form a support surface for the cover layer 14. The second variant facilitates a particularly flat surface to the data storage configuration according to the invention.

FIG. 2 shows a variant in which the connection 31 between the card base 10 and the display device 20 is made in the area of the sidewall 17. Such a variant is also conceivable depending on the thickness of the display device 20. The connection 31 can be on either the sidewall 17 or the floor 18 or on both.

The invention makes possible a data storage configuration in which the display device 20 is only fixed to the card base 10 in one section. Thus the display device 20 is not connected to the card base 10 over an extensive area. Therefore the display device 20 can slide against the card base 10 and any cover layer that exists. As a result stresses acting on the display device 20, for instance by bending, can be greatly reduced.

We claim:

1. A portable data storage configuration, comprising:
a card base having a main surface; and
a display device having a main surface disposed opposite said main surface of said card base, said card base permanently connected to said display device over only one partial region of said main surface of said card base and said main surface of said display device, the connection over the partial region defining the only permanent connection between said display device and said card base and defining areas of the main surface of said card base and of said main surface of the display device not being part of the partial region and being moveable with respect to each other.

2. The data storage configuration according to claim 1, wherein said card base has a face with a recess formed therein and said display device is disposed in said recess.

3. The data storage configuration according to claim 2, wherein:
said main surface of said display device is a passive face;
said recess is defined by a floor forming said main surface of said card base; and
said display device is fixed to said floor over a section of said passive face.

4. The data storage configuration according to claim 3, wherein said permanent connection between said display device and said card base is provided in an area at an edge of said floor of said recess.

5. The data storage configuration according to claim 3, further comprising a lubricant disposed between said passive face of said display device and said floor.

6. The data storage configuration according to claim 2, wherein:
said main surface of said display device is a sidewall; and
said main surface of said card base is a sidewall defining said recess, said permanent connection formed between said sidewalls.

7. The data storage configuration according to claim 1, wherein said card base contains a first contact element, and said display device contains a second contact element, said first and second contact elements forming said permanent connection by being connected together electrically and mechanically to each other.

8. The data storage configuration according to claim 1, further comprising a cover layer, and said display device has an active face covered by said cover layer.

9. The data storage configuration according to claim 8, wherein said cover layer is fixed to said card base, and has no fixed connection to said display device.

10. The data storage configuration according to claim 9, further comprising a lubricant disposed between said cover layer and said active face of said display device.

11. The data storage configuration according to claim 8, wherein said cover layer is a polarizer.

12. The data storage configuration according to claim 1, wherein said permanent connection includes a conducting adhesive.

13. A portable data storage configuration, comprising:
a card base having a main surface;
a display device having a main surface disposed opposite said main surface of said card base, said card base permanently connected to said display device over only a partial region of said main surface of said card base and said main surface of said display device, defining a permanent connection;
a cover layer, said display device having an active face covered by said cover layer;
said card base having a recess formed therein and said display device being disposed in said recess; and
said card base having a further recess formed therein, said further recess having lateral dimensions larger than those of said recess and being approximately equivalent to those of said cover layer, said recess and said further recess defined by respective sidewalls being positioned approximately equidistantly in order to create a support surface for said cover layer.

14. A portable data storage configuration, comprising:
a card base having a main surface; and
a display device having a main surface disposed opposite said main surface of said card base, said card base permanently connected to said display device over only one partial region of said main surface of said card base and said main surface of said display device, the connection over the partial region defining the only permanent mechanical connection without an electrical connection between said display device and said card base and defining areas of said main surface of said card base and of said main surface of said display device not being part of the partial region and being moveable with respect to each other.

15. The data storage configuration according to claim 14, wherein said card base has a face with a recess formed therein and said display device is disposed in said recess.

16. The data storage configuration according to claim 15, wherein:
said main surface of said display device is a passive face;
said recess is defined by a floor forming said main surface of said card base; and
said display device is fixed to said floor over a section of said passive face.

17. The data storage configuration according to claim 16, wherein said permanent connection between said display device and said card base is provided in an area at an edge of said floor of said recess.

18. The data storage configuration according to claim 16, further comprising a lubricant disposed between said passive face of said display device and said floor.

19. The data storage configuration according to claim 15, wherein:
said main surface of said display device is a sidewall; and
said main surface of said card base is a sidewall defining said recess, said permanent connection formed between said sidewalls.

20. The data storage configuration according to claim 15, further comprising a cover layer, said display device having an active face covered by said cover layer.

21. The data storage configuration according to claim 20, wherein said cover layer is fixed to said card base, and has no fixed connection to said display device.

22. The data storage configuration according to claim 21, further comprising a lubricant disposed between said cover layer and said active face of said display device.

23. The data storage configuration according to claim 20, wherein said card base has a further recess formed therein, said further recess having lateral dimensions larger than those of said recess and approximately equivalent to those of said cover layer, said recess and said further recess defined by respective sidewalls being positioned approximately equidistantly in order to create a support surface for said cover layer.

24. The data storage configuration according to claim 20, wherein said cover layer is a polarizer.

25. The data storage configuration according to claim 14, wherein said card base contains a first contact element, and said display device contains a second contact element, said first and second contact elements forming said permanent connection by being connected together electrically and mechanically.

26. The data storage configuration according to claim 14, wherein said permanent connection includes a conducting adhesive.

\* \* \* \* \*